United States Patent
Ueberschär et al.

(10) Patent No.: US 8,505,369 B2
(45) Date of Patent: Aug. 13, 2013

(54) ARRANGEMENT AND METHOD FOR DETERMINING THE OIL CONSUMPTION OF AN OIL-LUBRICATED MACHINE

(75) Inventors: Dietmar Ueberschär, Mörfelden-Walldorf (DE); Dieter Schulmeyer, Büttelborn (DE)

(73) Assignee: Hochschule Darmstadt, University of Applied Sciences, Darmstadt (DE)

( * ) Notice: Subject to any disclaimer, the term of this patent is extended or adjusted under 35 U.S.C. 154(b) by 182 days.

(21) Appl. No.: 12/673,497

(22) PCT Filed: Aug. 14, 2008

(86) PCT No.: PCT/EP2008/006709
§ 371 (c)(1),
(2), (4) Date: May 14, 2011

(87) PCT Pub. No.: WO2009/021744
PCT Pub. Date: Feb. 19, 2009

(65) Prior Publication Data
US 2011/0259126 A1    Oct. 27, 2011

(51) Int. Cl.
*G01M 15/09*    (2006.01)
(52) U.S. Cl.
USPC .................................................. 73/114.56
(58) Field of Classification Search
None
See application file for complete search history.

(56) References Cited

U.S. PATENT DOCUMENTS

| | | | | |
|---|---|---|---|---|
| 2,656,177 A | * | 10/1953 | Liddell | 177/192 |
| 3,908,450 A | * | 9/1975 | Schreiber | 73/114.52 |
| 5,273,134 A | * | 12/1993 | Hegemier et al. | 184/6.4 |
| 5,341,674 A | * | 8/1994 | Kunzfeld | 73/116.02 |
| 2006/0137428 A1 | * | 6/2006 | Agama et al. | 73/1.16 |

FOREIGN PATENT DOCUMENTS

| | | |
|---|---|---|
| DE | 202005008511 U1 | 9/2005 |
| DE | 102005056964 U1 | 6/2007 |
| FR | 2871233 A | 12/2005 |
| JP | 2002339721 | * 11/2002 |

OTHER PUBLICATIONS

International Search Report for corresponding International Application PCT/EP2008/006709.

* cited by examiner

*Primary Examiner* — Robert R Raevis
(74) *Attorney, Agent, or Firm* — WRB-IP LLP

(57) ABSTRACT

An arrangement is provided for determining the oil consumption of an oil-lubricated machine. The arrangement includes an oil circuit, which leads from an oil tank via a start line to the oil-lubricated machine and back, via a return line to the oil tank, and a balance for determining the weight of oil in the oil tank. A device for heating oil is assigned to the start line in such a way that the oil is heated to a predeterminable operating temperature for the oil-lubricated machine before reaching the oil-lubricated machine. A method for determining oil consumption is also provided.

13 Claims, 3 Drawing Sheets

ARRANGEMENT AND METHOD FOR DETERMINING THE OIL CONSUMPTION OF AN OIL-LUBRICATED MACHINE

BACKGROUND AND SUMMARY

The invention concerns an arrangement and method for determining the oil consumption of an oil-lubricated machine, in particular, a compressive oil-lubricated machine, such as an internal combustion engine, a compressor, a turbocharger, a pump, etc.

Such an arrangement is known for example from DE 20 2005 008 511 U1, in which an oil circuit is provided which leads from the oil pan of an internal combustion motor via an outer oil tank back to the oil pan. On the basis of this forced path of the oil circuit conclusions regarding oil consumption can be drawn via a gravimetric recording of the oil volume inside the oil tank.

A disadvantage of the known oil consumption determination emerges, mainly at the beginning of the measurement procedure, i.e., during the start-up phase of the internal combustion motor, in that large measurement fluctuations arise, which permit conclusions as to the oil consumption only conditionally, especially for the start activity of the combustion motor. Such measurement fluctuations are gathered from test results which are stated in FIG. 2 of the above-mentioned DE 20 2005 008 511 U1.

Furthermore, it must be observed that the oil consumption values calculated by means of the known measuring device arrangement on the whole were lower than the actual oil consumption in ordinary operation of the internal combustion engine when empirically ascertained.

It is desirable to improve the arrangement to determine the oil consumption of an oil-lubricated machine, so that oil consumption measurement can be carried out more precisely in the start-up phase of the internal combustion engine as well.

A device for heating oil according to an aspect of the present invention is assigned to the start line in such a way that oil is heatable to a predeterminable operating temperature, which preferably corresponds to the optimal operating conditions of the machine, before reaching the machine. By heating the oil, practical conditions for oil consumption measurement are created, whereby unforeseeable measurement fluctuations still encountered in the prior art can be equalized.

For example, the heating device can be realized by means of suitable heating casings on the start line, which heat the flowing or standing oil volume in the start line until the desired operating temperature of the oil is reached.

In order, however, to provide a near-operation simulation of the oil circuit during the preheating phase as well, the oil circuit arrangement can have a bypass-line to short-circuit the start line or feed line and the return line, for example, to separate the working machine from the oil circuit. By means of the bypass line, the oil inside the oil circuit can be heated while maintaining the flow of oil, until the desired operating temperature for all oil in the oil circuit is reached. Preferably, the bypass line is connected to the start or return line upstream of the internal combustion engine via a 3-way valve. The 3-way valve can be controlled in such a way that the start line is fully blocked up to the oil-lubricated machine and the entire oil flow reaches the return line via the bypass line. In this way the entire oil volume in the start and return line and in the oil tank is heated by the heating device to the preferred prescribed operating temperature approximately equally.

In a preferred embodiment of an aspect of the invention, a temperature sensor for determining oil temperature is arranged, preferably directly upstream of the heating device, in order to provide data to a temperature regulator for regulating activation of the heating device.

Furthermore, a pressure sensor for determining oil pressure can be arranged upstream of the heating device. In the process, the pressure sensor is connected to a pressure regulator, which activates the oil pump built into the start line. In order to prevent incoming oil from flowing back into the oil tank when there are pressure fluctuations in the conduit system, preferably a non-return valve can be built into the intake line. In this way weight fluctuations in the precision balance can be avoided. With the help of this arrangement the necessary oil pressure can also be adjusted with the help of a frequency converter, which can regulate the speed of an oil pump.

Preferably, a further pressure sensor for determining oil pressure is arranged upstream of the working machine and downstream of the heating device, in order to register the effective oil pressure before the machine is reached, and to be able to control it.

In an alternative or additional implementation of an aspect of the invention, in order to increase the precision of the oil consumption determination, the generic arrangement is provided with a blow-by gas passage which is attached to the oil circuit. The blow-by gas passage should lead blow-by gas created by the machine away from the oil circuit. The oil particles contained in the blow-by gas are separated by a filtration system in order to be able to determine their weight. In normal operation, the blow-by gas would be fed back to the machine. In the invention, the weight calculated from the blow-by gas is computed, whereby actual oil consumption can be calculated.

Preferably, the blow-by gas passage discharges upstream of the combination of the bypass line and the return line, before the bypass line and the return line meet, in order to affect the oil circuit as little as possible.

In order to realize adequate diversion of the blow-by gas, preferably a blow-by gas pump is arranged in the blow-by gas passage.

In a preferred embodiment of an aspect of the invention, there is at least one filter with a specially assigned magnet valve upstream of the blow-by gas pump. Alternatively, there can be two filters connected parallel to each other, each with a specially assigned magnet valve, upstream of the blow-by gas pump.

In addition, an aspect of the invention concerns a device for determining the oil consumption of an oil-lubricated machine, in which oil is pumped in from an oil tank and out to the working machine, and from there is led back to the oil tank, whereby the weight of the oil volume found in the oil tank is continuously measured gravimetrically. According to the invention, the oil is heated before passing through the machine to a predeterminable operating temperature for the working machine.

Preferably, the oil pressure and the oil temperature are adjusted to the operating conditions of the machine, before the oil consumption determination process is initiated.

Preferably, the blow-by gases with oil particles contained therein are led to an oil circuit which leads from the oil tank to the machine and back to the oil tank.

BRIEF DESCRIPTION OF THE DRAWINGS

Other advantages, characteristics and features of the invention will be clearly shown through the following description of a preferred embodiment of the invention with the help of the attached diagrams, in which.

DETAILED DESCRIPTION

Figure 1:
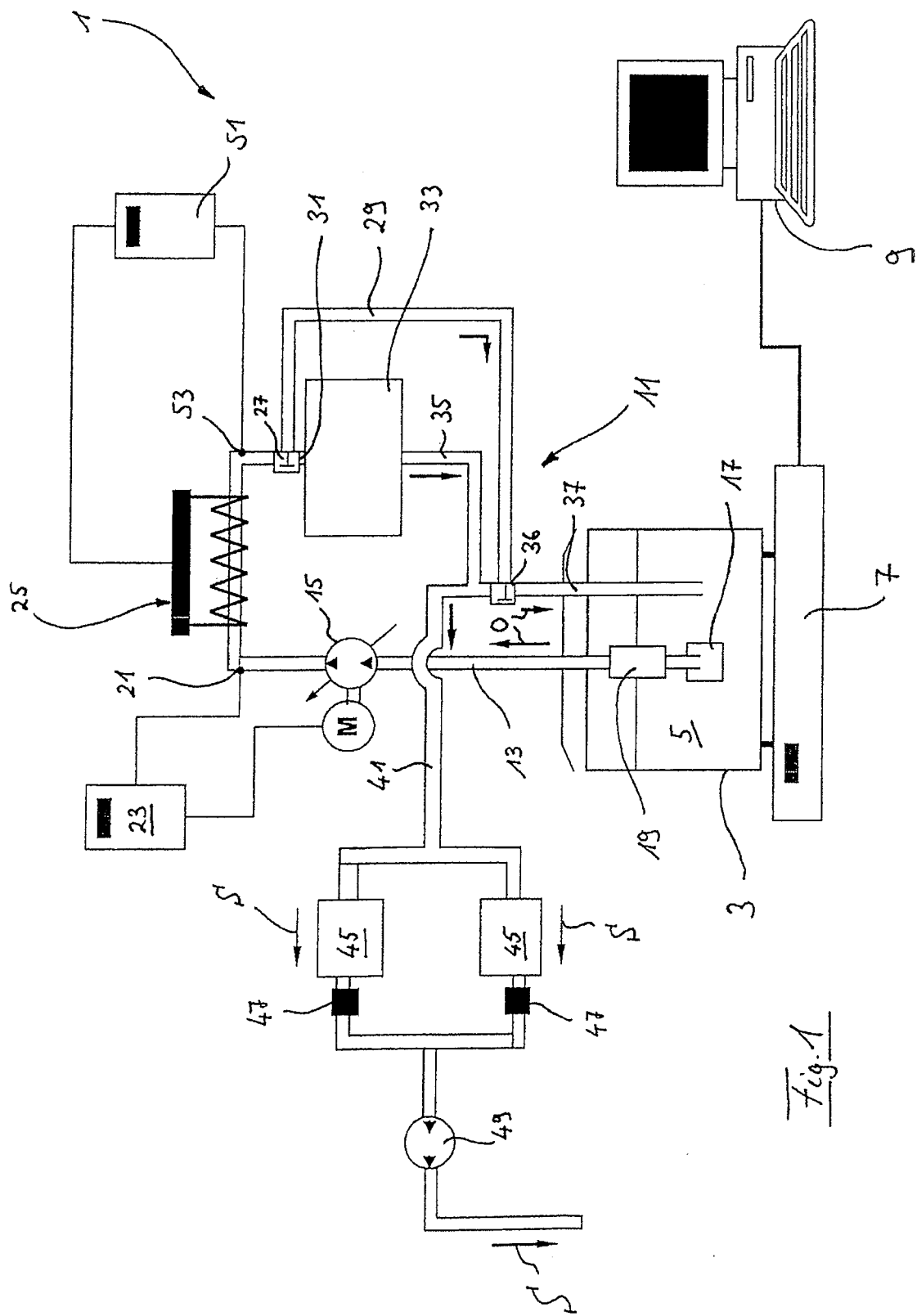
FIG. 1 shows a schematic diagram of the arrangement according to the invention to determine the oil consumption of a turbocharger.

In FIG. 1, the overall arrangement for determining the oil consumption of a turbocharger according to the invention is marked with the reference number 1. The arrangement 1 comprises an oil pan 3 in which oil 5 is stored in sufficient volume. The oil pan 3 stands on a precision balance 7 with a maximum load of, for example, 36 kg, with an accuracy of at least ⅒ g. To conduct weight data processing, the precision balance 7 is joined electrically to a data capture system 9, in which the weight measurement data is continuously recorded, processed and stored.

The oil consumption determination arrangement 1 also has an oil circuit 11, the oil flow of which is indicated with arrows O. The oil circuit 11 leads from the inside of the oil pan 3 via a start line 13 to a pump 15 which is operated by a motor M, and which supplies the intake pressure to produce the oil flow. An intake filter 17 is provided for the infeed to the start line 13 on the side of the oil pan, which purifies the oil to be taken in before entering the start line. Directly downstream from the intake filter 17, a non-return valve 19 is integrated in the start line 15 [sic], which should prevent a backflow of oil that has been taken in when there are pressure fluctuations in the conduit system of the oil circuit 11. Downstream of the pump 15, a pressure sensor 21 is installed, which records oil pressure. The recorded oil pressure data of the pressure sensor 21 is transmitted by a pressure regulator 23 which regulates the oil pressure according to the necessary operating conditions for the off-gas turbocharger and controls the pump 21 via the controlling element M.

Downstream of the pressure sensor 21 is a heating device 25 which the start line 13 encircles area by area and that heats the oil held within, before it reaches a 3-way valve 27 arranged downstream of the heating device. In the direction of flow, the 3-way valve bifurcates the start line into a turbo charger line 31 and bypass line 29. The turbo charger line 31 leads to the turbo charger 33. From the turbo charger 33 a discharge line 35 leads via a 3-way valve 36 back to a return line 37, which flows back in the oil pan 3. The bypass line 29 flows in the 3-way valve 36, so that with the bypass line 29 the start line 13 and the return line 37 are "short-circuited" by going around the turbo charger 33 and the discharge line 35.

A blow-by gas line 41 extends from the bypass line 29 and the 3-way valve 36.

The blow-by gas line 41 splits downstream into a parallel circuitry with two parallel sections of line, in each of which is arranged a filter 45 and a magnet valve 47. Following the parallel switching line, a blow-by gas pump 49 is attached, which operates the diversion of blow-by gas corresponding to the flow direction S.

Below, the mode of operation of the arrangement for determining oil consumption 1 according to FIG. 1 will be described.

In a start phase in which the oil in the arrangement for determining oil consumption is still cold, the 3-way valve 27 is connected in such a way that the start line 13 and the return line 37 is short-circuited [sic], and the turbo charger is shut off from the oil circuit 11. After activation of the heating device 25, the heating device 25 heats the passing oil until it is heated to the desired operating temperature of the turbo charger 33. Finally, the 3-way valve 27 is shut off, so that the internal combustion engine with off-gas turbo charger can be put into operation and adequate oil lubrication is guaranteed.

During the start phase and the normal operation of the turbo charger 33, the oil volume inside the oil pan 3 is continuously recorded gravimetrically and delivered to the data capture system 9.

In order for the oil to have the desired operating temperature, downstream of the heating device 25 and upstream of the 3-way valve 27, a temperature and pressure sensor 53 is provided, which is connected to a temperature regulator which controls the heating device 25.

It was determined that with the method according to the invention of preheating the oil of the oil circuit 11, measurement fluctuations during the start-up phase of the turbo charger can be avoided and exact information regarding oil consumption is possible, including when the turbo charger is in a critical operating situation.

By means of the blow-by gas line 41, the blow-by gas, which contains oil particles, is pumped out with a pump 49 and filtered in the filters 45. In this way, the oil particles which would be otherwise lost in the blow-by gas are not incorrectly incorporated into the account of the oil consumption.

Figure 2:
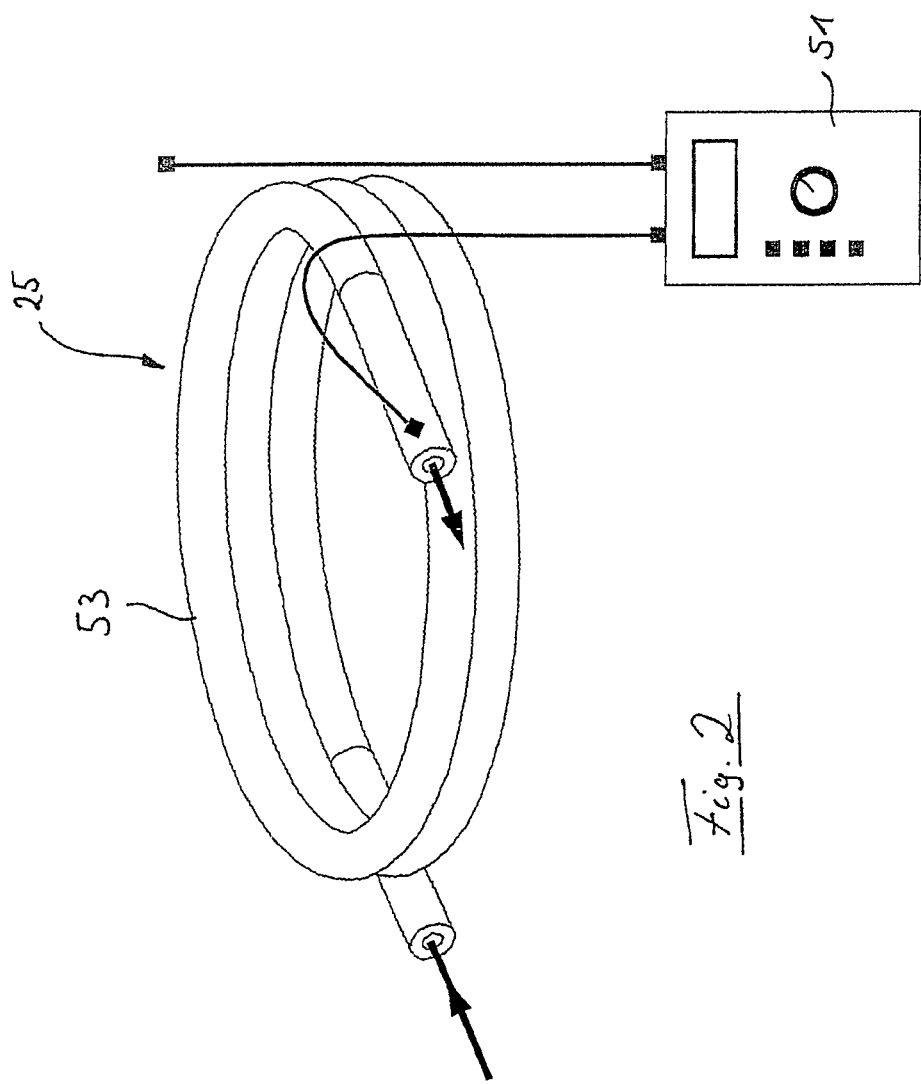
FIG. 2 shows a perspective schematic diagram of an example for a heating system to be assembled in the arrangement according to FIG. 1.

In FIG. 2, a heating device 25 according to the invention is depicted in detail. The heating device 25 consists essentially of or comprises a high quality steel spiral pipe 53 encased in a heating tube. The heating tube is adjusted, by means of the temperature measurement value calculated by the temperature sensor 53, to the desired operating temperature for the internal combustion engine by the temperature regulator 51, coded via a display and adjustment knob. The inner wall of the conduit through which the oil passes, as indicated by the arrows, is provided with a slick surface of the type that minimizes flow loss and prevents air bubble formation within the tube.

In the area of the heating device 25 the conduit spirals up steadily in order to prevent air from being trapped in the area of the heating device. In this way, a faster heat input can be achieved in the oil to be heated along the heating device. Simultaneously, this keeps the construction of the arrangement 1 compact.

Figure 3:
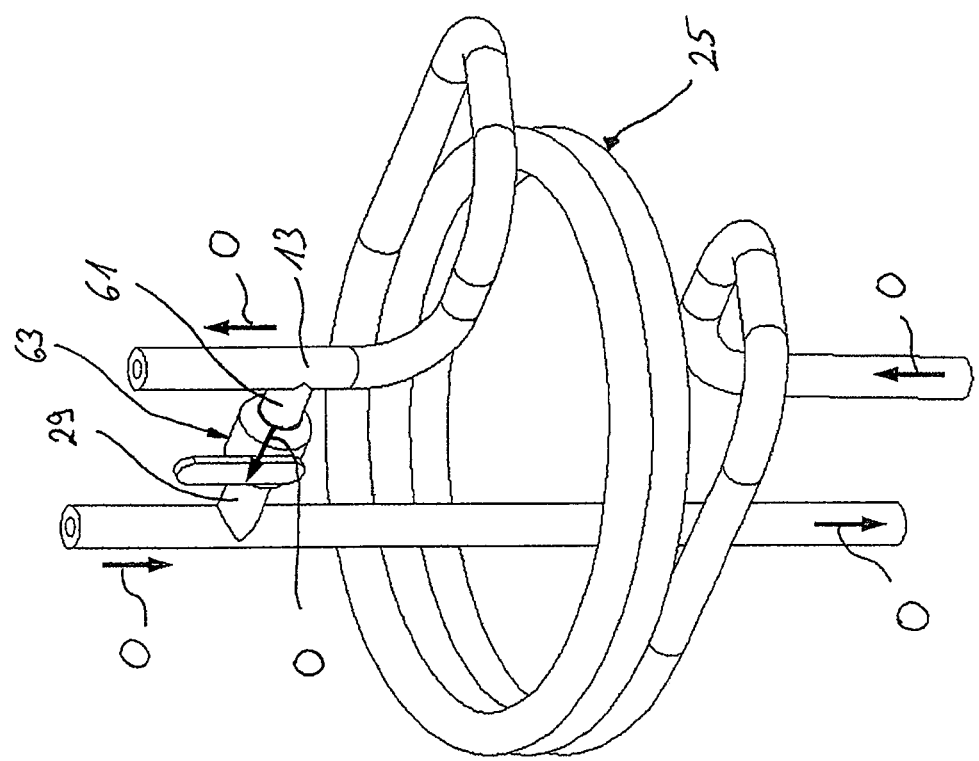
FIG. 3 shows a perspective schematic diagram of a conduit system able to be inserted in the arrangement according to the invention with a bypass.

In FIG. 3 a part of the oil circuit flow 11 according to the invention with the heating device 25 is schematically presented. Directly past the heating device 25, a cross line 61 forming the bypass line is attached to the start line 13, which features a shut-off valve 63 in the middle for opening and closing the bypass line. The cross line 61 flows into the return line 35. Particularly in the area of the heating line and also in other parts of the oil circuit flow 11, heed should be paid to forming as few stage bays or undercutting transitions as possible, in order to avoid fluidic holdups and dead areas for the oil.

The features disclosed in the foregoing description, as well as in the diagrams and claims, can be relevant both singly and in any combination for the realization of the invention in the various embodiments.

LIST OF REFERENCE NUMBERS

1 Device for determining oil consumption
3 Oil pan
5 Oil
7 Precision balance
9 Data capture system 11 Oil circuit
13 Start line
15 Pump
17 Intake filter
19 Non-return valve
21 Pressure sensor
23 Pressure regulator
25 Heating device
27, 36 3-way valve
29 Bypass line
31 Turbo charger line
33 Turbo charger
35 Discharge line
37 Return line
41 Blow-by gas line
43 3-way valve
45 Filter
47 Magnet valve
49 Blow-by gas pump
51 Temperature regulator
53 T-sensor [Temperature sensor]
61 Cross line
63 Shut-off valve
M Controlling element
O Oil flow
S Blow-by gas flow

The invention claimed is:

1. Arrangement for determining the oil consumption of an oil-lubricated machine, comprising an oil circuit, which leads from an oil tank via a start line to the oil-lubricated machine and back, via a return line to the oil tank, and a balance for determining the weight of oil in the oil tank, wherein a device for heating oil is assigned to the start line in such a way that the oil is heated to a predeterminable operating temperature for the oil-lubricated machine before reaching the oil-lubricated machine, wherein a temperature sensor for determining oil temperature is arranged directly downstream of the device, and the temperature sensor is joined to a temperature regulator which controls the device in such a way that the oil can be brought to a predeterminable operating temperature for the oil-lubricated machine.

2. Arrangement according to claim 1, wherein the oil circuit features a bypass line to short-circuit the start and return line, whereby the bypass line is connected to the start line via a 3-way valve.

3. Arrangement according to claim 1, wherein a pressure sensor for determining oil pressure is arranged upstream of the device, whereby the pressure sensor is joined to a pressure regulator which controls an oil pump built into the start line.

4. Arrangement according to claim 3, wherein there is a non-return valve connected upstream of the oil pump.

5. Arrangement according to claim 1, wherein a pressure sensor for determining oil pressure is arranged upstream of the machine.

6. Arrangement according to claim 1 wherein a blow-by gas passage is connected to the oil circuit, which leads blow-by gas of the oil-lubricated machine away from the oil circuit.

7. Arrangement according to claim 6, wherein the blow-by gas passage flows upstream into the bypass line.

8. Arrangement according to claim 6, wherein there is a blow-by gas pump arranged in the blow-by gas passage.

9. Arrangement according to claim 8, wherein at least one filter with a specifically assigned magnet valve connected upstream to the blow-by gas pump.

10. Arrangement according to claim 8, wherein two filters connected parallel to each other, each with a specifically assigned magnet valve, are connected upstream to the blow-by gas pump.

11. Process for determining the oil consumption of an oil-lubricated machine, comprising:
    feeding oil from an oil tank out to the machine and from there back to the oil tank;
    continuously gravimetrically measuring the weight of the oil volume found in the oil tank;
wherein the oil is heated before flowing through the oil-lubricated machine to a predeterminable operating temperature for the oil-lubricated machine, and wherein blow-by gases with oil particles contained therein are diverted from an oil circuit which leads from the oil tank to the oil-lubricated machine and back to the oil tank.

12. Method according to claim 11, wherein the oil pressure and the oil temperature are adjusted to the corresponding operating conditions of the oil-lubricated machine.

13. Method according to claim 11 performed with an arrangement for determining the oil consumption of an oil-lubricated machine, comprising an oil circuit, which leads from an oil tank via a start line to the oil-lubricated machine and back, via a return line to the oil tank, and a balance for determining the weight of oil in the oil tank, wherein a device for heating oil is assigned to the start line in such a way that the oil is heated to a predeterminable operating temperature for the oil-lubricated machine before reaching the oil-lubricated machine.

* * * * *